United States Patent
Beland et al.

(10) Patent No.: US 6,685,257 B1
(45) Date of Patent: Feb. 3, 2004

(54) EXTRUSION FOR THE SIDERAIL OF A VEHICLE TO PROVIDE HEAD IMPACT COUNTERMEASURE AND SUPPORT FOR SIDERAIL COMPONENTS

(75) Inventors: William R. Beland, Grand Haven, MI (US); Kirk Meyer, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 26 days.

(21) Appl. No.: 10/125,056

(22) Filed: Apr. 18, 2002

(51) Int. Cl.$^7$ ............................................. B60R 21/00
(52) U.S. Cl. ........................ 296/187.05; 296/97.11; 296/214; 280/728.1
(58) Field of Search ...................... 296/203.03, 97.9, 296/97.11, 210, 214, 215, 187.03, 187.05; 280/728.1, 728.2, 728.3, 730.1, 730.2, 736

(56) References Cited

U.S. PATENT DOCUMENTS

| | | | | |
|---|---|---|---|---|
| 1,941,032 A | * | 12/1933 | Knowles | |
| 2,932,539 A | * | 4/1960 | Galbraith | |
| 3,403,937 A | * | 10/1968 | Quaine | |
| 5,265,903 A | * | 11/1993 | Kuretake et al. | 280/730.2 |
| 5,538,310 A | * | 7/1996 | Frankhouse et al. | 296/97.4 |
| 5,575,500 A | | 11/1996 | Mimura et al. | |
| 5,605,353 A | | 2/1997 | Moss et al. | |
| 5,725,271 A | | 3/1998 | Patel et al. | |
| 5,735,569 A | * | 4/1998 | Takagi et al. | 296/210 |
| 5,755,457 A | | 5/1998 | Specht | |
| 5,791,683 A | * | 8/1998 | Shibata et al. | 280/730.2 |
| 5,820,204 A | | 10/1998 | Masuda et al. | |
| 5,851,046 A | * | 12/1998 | Kalkman et al. | 296/97.11 |
| 5,855,394 A | | 1/1999 | Horton et al. | |
| 5,988,678 A | | 11/1999 | Nakamura et al. | |
| 6,027,161 A | * | 2/2000 | Gondo | 296/214 |
| 6,079,732 A | * | 6/2000 | Nakajima et al. | 280/728.2 |
| 6,106,006 A | | 8/2000 | Bowers et al. | |
| 6,142,506 A | * | 11/2000 | Patel et al. | 280/728.2 |
| 6,145,908 A | | 11/2000 | Deb et al. | |
| 6,168,204 B1 | | 1/2001 | Beckman | |
| 6,173,990 B1 | | 1/2001 | Nakajima et al. | |
| 6,179,324 B1 | * | 1/2001 | White, Jr. et al. | 280/730.2 |
| 6,189,930 B1 | | 2/2001 | Kalazny | |
| 6,254,172 B1 | * | 7/2001 | Takahara | 296/189 |
| 6,286,887 B1 | * | 9/2001 | Hashmi | 296/97.11 |
| 6,296,269 B1 | * | 10/2001 | Nagai et al. | 280/728.2 |
| 6,302,477 B1 | * | 10/2001 | Satou | 296/189 |
| 6,312,008 B1 | * | 11/2001 | Neag | 280/728.2 |
| 6,328,370 B1 | * | 12/2001 | Kim | 296/97.9 |
| 6,592,143 B2 | * | 7/2003 | Takahashi et al. | 280/730.2 |
| 2003/0107242 A1 | * | 6/2003 | Fox et al. | 296/189 |

FOREIGN PATENT DOCUMENTS

| | | |
|---|---|---|
| DE | 23 59 718 A1 | 6/1975 |
| DE | 198 12 737 A1 | 5/1999 |
| DE | 198 06 767 A1 | 8/1999 |
| EP | 0 520 167 A1 | 12/1992 |
| EP | 0 800 956 A1 | 10/1997 |
| EP | 0 852 191 A1 | 7/1998 |
| EP | 1 013 505 A2 | 6/2000 |
| WO | WO 01144027 A1 | 6/2001 |

* cited by examiner

Primary Examiner—D. Glenn Dayoan
Assistant Examiner—H. Gutman
(74) Attorney, Agent, or Firm—Foley & Lardner

(57) ABSTRACT

An extrusion made from metal or plastic extends along the siderail of a vehicle and acts as a head impact countermeasure, and in the preferred embodiment as a platform for the attachment of any of a variety of siderail attachments, such as grab handles, coat hooks, visor tracks, etc. The components can be attached in a way which permits them to slide to the appropriate position and be locked into place. The hollow interior of the extrusion can be used to house additional safety components, such as a side air bag.

44 Claims, 4 Drawing Sheets

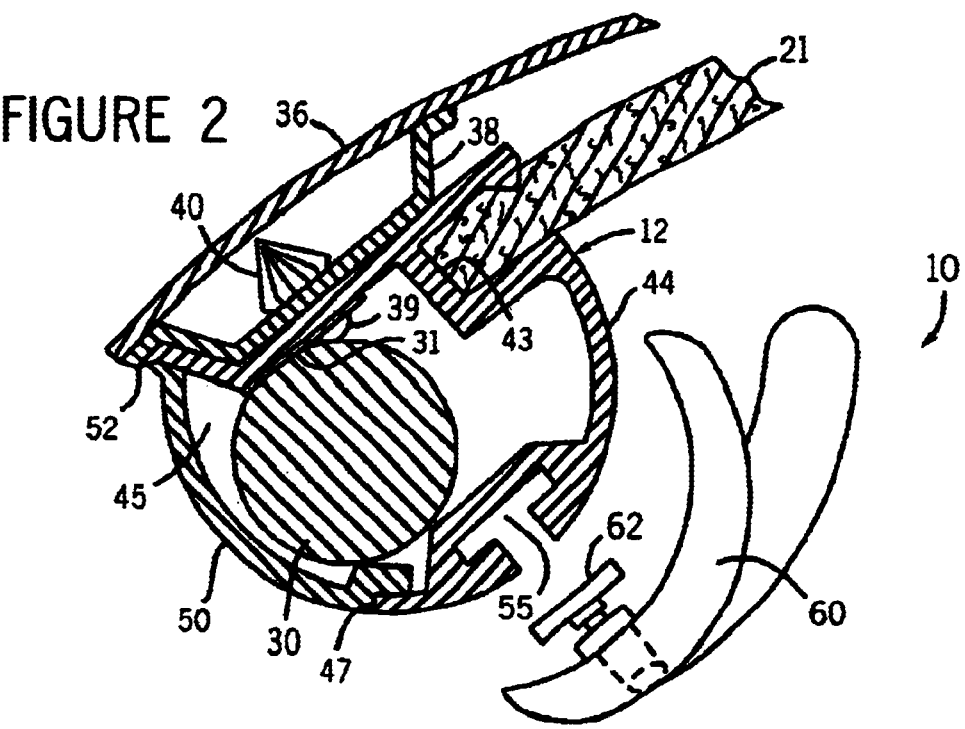
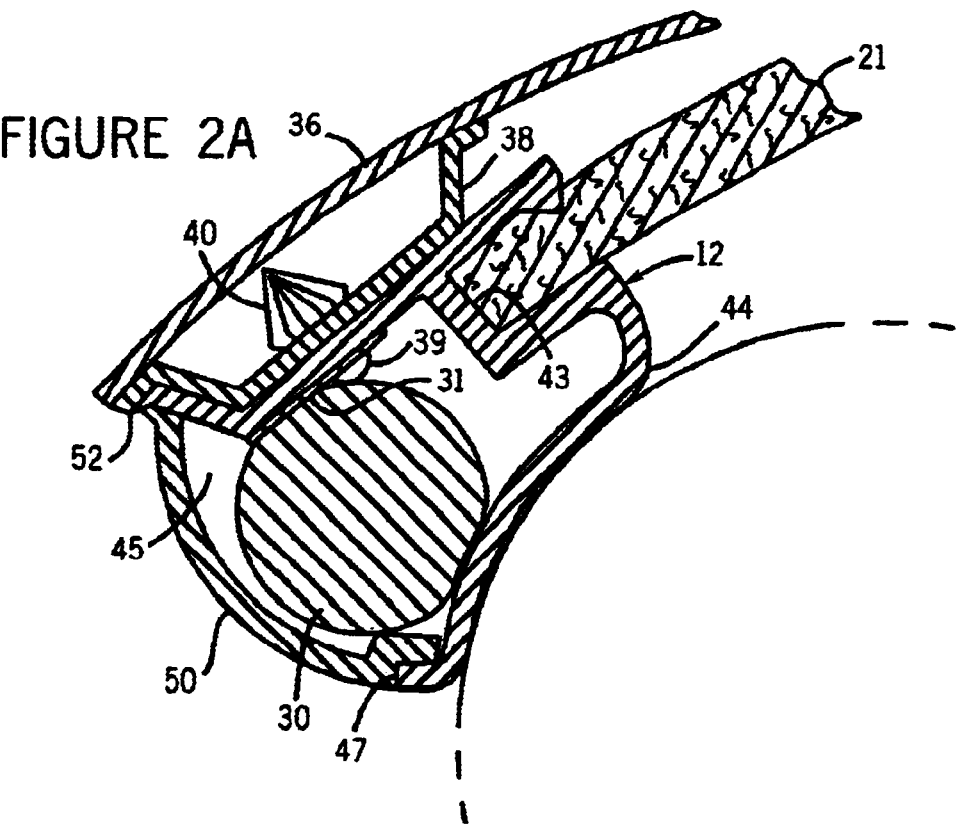

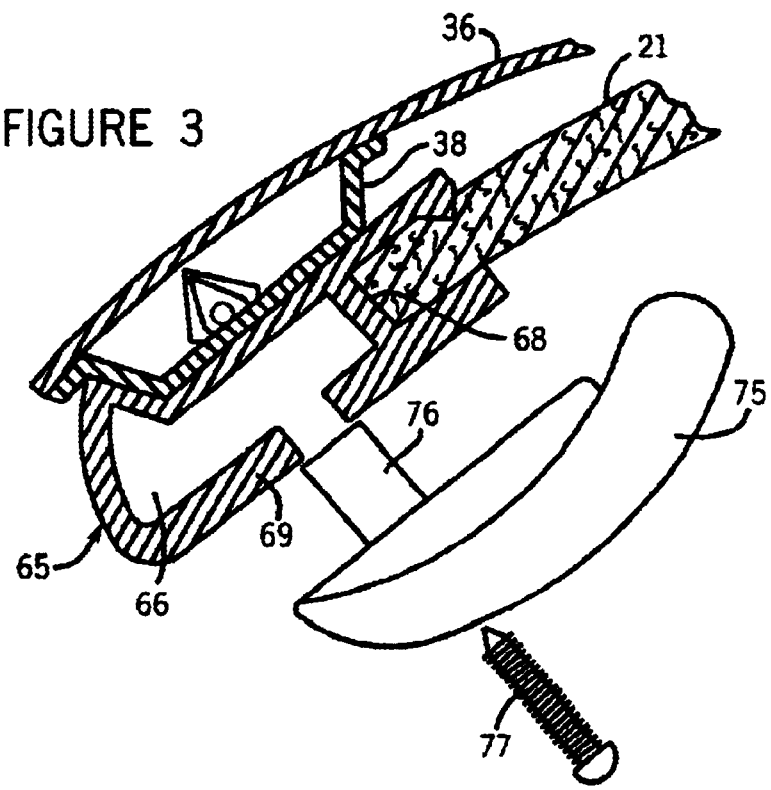
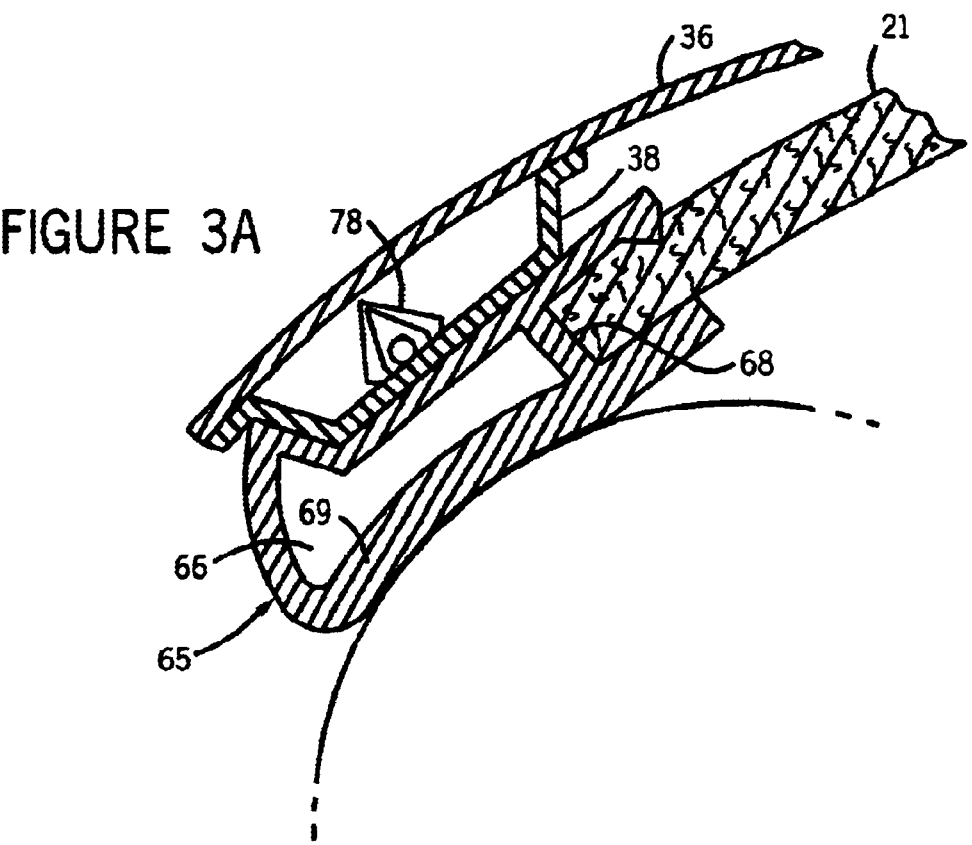

EXTRUSION FOR THE SIDERAIL OF A VEHICLE TO PROVIDE HEAD IMPACT COUNTERMEASURE AND SUPPORT FOR SIDERAIL COMPONENTS

Cross-reference to related patent applications, if any: None.

BACKGROUND OF THE INVENTION

1. Field of the Invention

The present invention relates generally to the field of vehicle occupant protection systems and more particularly to systems used to absorb energy and to decelerate portions of an occupants body in the event of an accident/impact. Still more specifically, the invention relates to an extrusion attached in the vicinity of the vehicle siderails which provides energy absorbing capability, as well as a platform for the attachment of a variety of siderail components and visors. In its most preferred embodiment, each extrusion allows siderail components to slide along its length and to be locked in the desired location. Furthermore, the extrusion can be hollow to receive additional components, such as side impact air bags.

2. Description of the Prior Art

New standards in the United States (e.g., FMVSS 201) mandate that vehicle components must be able to absorb energy to decelerate an occupant in the case of an accident/impact. It has been known for some time that the siderails, as well as other vehicle components can provide assistance in reducing injuries from side impacts, roll-over accidents, and the like. Several prior art references discuss siderail protection elements. For example, Kalazny, in U.S. Pat. No. 6,189,930, issued Feb. 20, 2001, and entitled "Joint Between Side Rail and Cross Member in a Vehicle Frame Assembly", a joint between a siderail and a cross member includes separate webs extending from grooves at the upper and lower portions of the siderail. A general representation of the prior art is shown in FIG. 1 of U.S. Pat. No. 6,189,930.

Nakajima et al., in U.S. Pat. No. 6,173,990, issued Jan. 16, 2001, and entitled "Interior Equipment Mounting Structure for a Vehicle Incorporating Head-Protecting Air Bag Body" describes the mounting of a side impact air bag adjacent to the siderail of a vehicle, the structure being particularly designed for the plastic deformation of a component without interference with other interior equipment, such as sun visors.

An "Energy Absorbing Automotive Vehicle Body Structure" is described in Patel et al., U.S. Pat. No. 5,725,271, issued Mar. 10, 1998. In this device, a structural member (such as a siderail) of a vehicle serves as the mounting structure for trim components which include spring-like serpentine elements to assist in energy absorption. The trim members are separated from the structural members using such serpentine elements. A plurality of serpentine elements may be used for particular trim components.

A different energy absorbing system is shown in U.S. Pat. No. 5,988,678, issued Nov. 23, 1999, to Nakamura et al., and entitled "Structure for Mounting of Internal Part for Vehicle." In this device, especially that shown in FIGS. 2 and 3, an energy absorbing pad is mounted to the siderail and between the siderail and the vehicle headliner. The patent does not show any type of extrusion structure to which individual vehicle components can be added.

A still further occupant protection system is shown in U.S. Pat. No. 5,575,500, issued Nov. 19, 1996, to Mimura et al., and entitled "Occupant Protecting Structures of Vehicle Body Upper Portions". In this device, the pillar components include energy absorbing devices located between the pillar inner panel and pillar outer panels as shown in FIG. 1. A variety of different embodiments are also discussed in this patent.

U.S. Pat. No. 6,145,908, issued Nov. 14, 2000, to Deb et al., and entitled "Energy Absorbing Continuously Compliant Swept Arch for Interior Trim" describes an energy absorbing system located, for example, on the "A" pillar of a vehicle.

Other vehicle frame and energy management systems are shown in U.S. Pat. No. 6,168,204, issued Jan. 2, 2001, to Beckman for "Vehicle Frame Assembly Having Integral Support Structures"; U.S. Pat. No. 5,855,394, issued Jan. 5, 1999, to Horton et al., for "Motor Vehicle Frame Assembly and Method of Forming the Same"; U.S. Pat. No. 5,820,204, issued Oct. 13, 1998, to Masuda et al., for "Body Structure for a Motor Vehicle"; and U.S. Pat. No. 5,605,353, issued Feb. 25, 1997, to Moss et al., for "Vehicle Chassis With Energy Management."

While these different solutions have been proposed in the past, many of them are non-compliant with new federal regulations for head impact. Moreover, there has been a continuing, and as of yet unresolved, conflict between providing sufficient energy absorption in the siderail area and providing sufficient room in the vehicle interior, especially head room. The greater the amount of impact absorption material (such as urethane foam or the like), the more space within the vehicle is occupied by such a device. The less material used, the less the impact countermeasure.

In addition to the aforementioned issues involving occupant protection, another need in vehicle design is the proper location and installation of various vehicle accessories, such as grab handles, visors, coat hooks, siderail lighting, as well as a wide variety of new overhead components being devised by vehicle manufacturers for educational, entertainment or informational purposes. Such uses include, but certainly are not limited to, ports for computer connections, navigation systems and the like. While it is most desirable that these features be added at the location where the overhead system is assembled, with some vehicle designs, it may be necessary to install them at the final assembly plant. Such assembly can be time consuming and therefore costly. Moreover, most of such accessories can only be located at a specific location, i.e., where holes are provided for the attachment to the sheet metal of the vehicle or the siderails.

A head impact countermeasure system which would occupy little space, provide sufficient countermeasure to achieve compliance with regulations and which also could optionally have the additional feature of being able to support siderail components would be a substantial advance in this art.

FEATURES AND SUMMARY OF THE INVENTION

A primary feature of the present invention is to provide a siderail head impact countermeasure which is compact and readily adaptable to a wide variety of vehicle designs.

Another feature of the present invention is to provide a siderail head impact countermeasure which can serve as a platform for the mounting of a variety of vehicle accessories.

A different feature of the present invention is to provide a siderail head impact countermeasure which can store and permit deployment of a side air bag.

Yet a further feature of the present invention is to provide a head impact countermeasure extrusion which can be attached to the siderail or the front and/or back headers, and which additionally can serve as a track for movable accessories, such as sun visors.

A different feature of the present invention is to provide an extrusion for impact countermeasure which may be made from a variety of different materials.

A related but still further feature of the present invention is to provide a head impact countermeasure for vehicles which may be easily matched in appearance to the remaining components of the interior of a vehicle.

Another feature of the present invention is to provide a head impact countermeasure for vehicles which allows an air bag to be easily installed in a roomy location. Furthermore, the countermeasure protects the air bag during installation.

How these and other features of the invention are accomplished, individually, collective, or in various subcombinations, will be described in the following detailed description of the preferred and alternate embodiments, taken in conjunction with the FIGURES. Generally, however, they are accomplished in the preferred embodiment by a siderail head impact countermeasure which includes a hollow extrusion attached to the vehicle siderail. The material for the extrusion is selected from metals, metal alloys or plastics which have certain deformation characteristics which will be discussed in detail below. The extrusion may furthermore be used as part of the support for the vehicle headliner or other overhead components, and preferably, is used as a platform for the attachment of vehicle accessories, such as grab handles, coat hooks, lights, visors, etc. The accessories may be mounted through the countermeasure to the vehicle sheet metal or siderails, or they may be removably or permanently attached to the countermeasure itself. In an especially preferred embodiment of the invention, the features are accomplished using a hollow countermeasure which also receives a side air bag which is deployed through a portion of the countermeasure at the time of an accident/impact. In one illustrated embodiment, a slot is formed along the countermeasure and a flap closes the slot. The air bag pushes the flap out of the way to permit deployment of the air bag when needed.

The countermeasure can also serve as a support for or a portion of a track system for a sun visor, such as a sun-tracking visor which is moved from the windshield area to the side windows when needed to protect occupants from direct sunlight.

Other ways in which the above-referenced features of the invention are accomplished will appear to those skilled in the art after they have read the following detailed description of the preferred embodiment and have reviewed the FIGURES. Such other ways are deemed to fall within the scope of the present invention if they fall within the scope of the claims which follow.

BRIEF DESCRIPTION OF THE DRAWINGS

In the following FIGURES, like reference numerals will be used to indicate like components.

FIG. 2 is a side sectional view taken through one of the countermeasure and illustrating the attachment of the countermeasure to the vehicle siderail, the air bag, the use of the countermeasure as a headliner support, a releasable flap system for air bag deployment, and one preferred technique for attaching vehicle accessories to the countermeasure; and FIG. 2 is a side sectional view taken through one of the countermeasures and illustrating the attachment of the countermeasure to the vehicle siderail, the air bag, the use of the countermeasure as a headliner support, a releasable flap system for air bag deployment, and one preferred technique for attaching vehicle accessories to the countermeasure;

FIG. 2A illustrates the system of FIG. 2 being deformed during impact with an occupant's head;

FIG. 3 is a view similar to FIG. 1 but showing a different countermeasure configuration, without an air bag and with a different system for attaching a vehicle accessory; and FIG. 3A illustrates the system of FIG. 3 being deformed during impact with an occupant's head.

Figure 1:
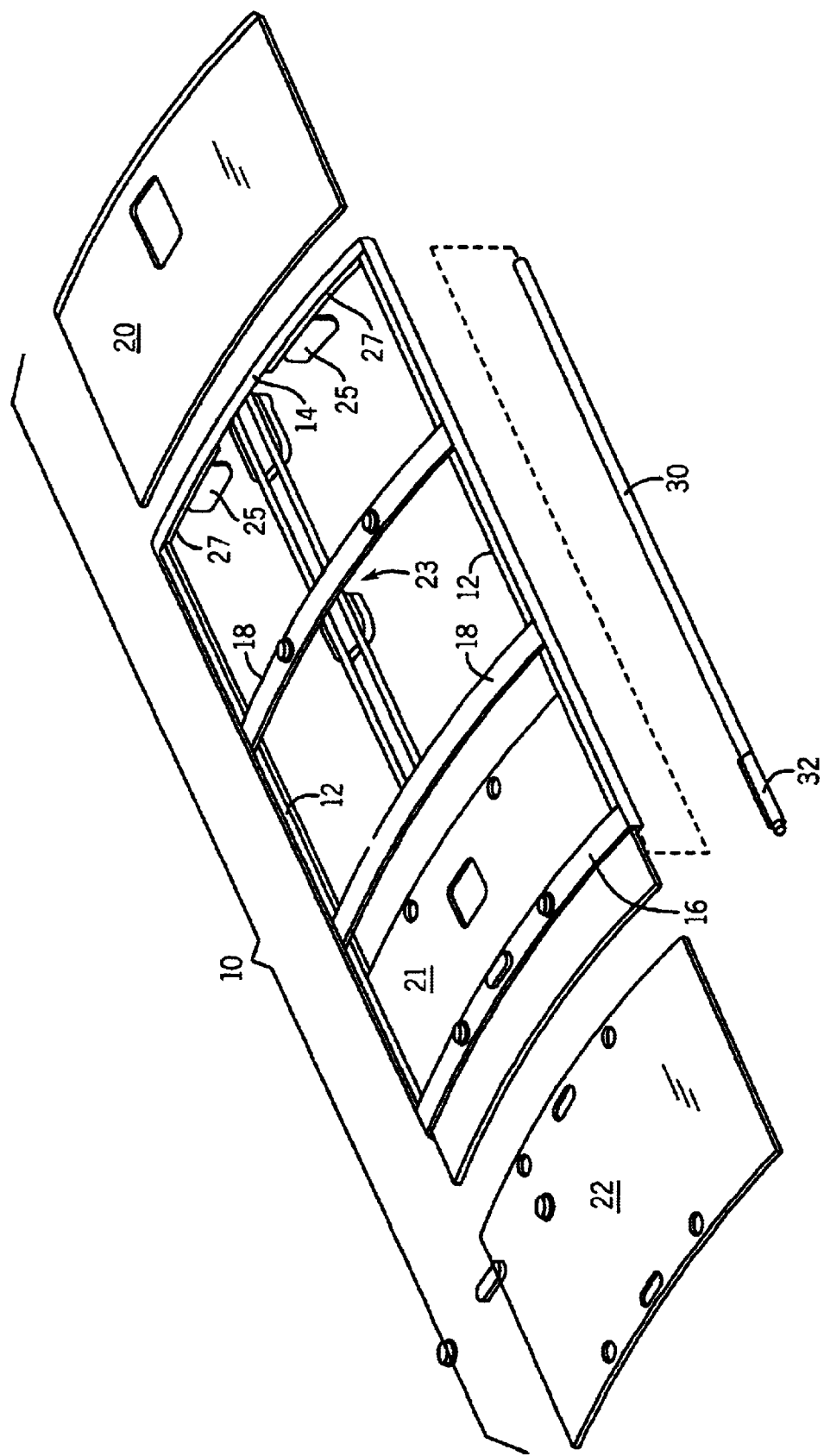
FIG. 1 is an exploded schematic illustration of siderail extrusions according to the present invention, and a preferred feature, i.e., the inclusion of an air bag and air bag inflator system within the countermeasures.

DETAILED DESCRIPTION OF THE PREFERRED AND ALTERNATE EMBODIMENTS OF THE PRESENT INVENTION

Before beginning the detailed description of the preferred and alternate embodiments of the present invention, several general comments can be made about the applicability and the scope thereof.

First, the particular materials from which the countermeasure of the present invention is constructed can vary substantially depending upon the particular cross sectional configuration of the countermeasure and the wall thicknesses thereof, as well as the properties of the materials employed. Generally, metals and metal alloys are the preferred material for construction, and generally a wall thickness between 0.5 mm and 5.0 mm is used. It will be appreciated by those skilled in the art of occupant protection, and those familiar with the regulations applicable thereto, that the countermeasure must be able to deform sufficiently to absorb an impact which is simulated in testing by propelling a spherical element at the countermeasure, the element having a surface simulating that of human skin. As the description continues, it will be apparent that the countermeasures of the present invention are preferably hollow and they will deform in relation to the severity of the accident/impact. The countermeasure should not fully collapse to the point that material used for its construction meets the siderails, providing no further countermeasure potential.

The preferred materials are metal or alloys, as indicated above, but plastics could also be used if they possess the deformation characteristics described above. The preferred material for use in the invention is aluminum having a wall thickness, depending upon the specific cross section, of between about 0.5 and 5.0 mm.

Two different configurations are shown for the siderail head impact countermeasures of the present invention in FIGS. 2 and 3. In FIG. 2, the countermeasure is secured to the siderail and assists in the support of the vehicle headliner. Furthermore, the countermeasure has a hollow interior adapted to receive a side air bag and a slot extending along its length to permit deployment of the air bag. The slot is closed by a flap, preferably of a different material than the countermeasure, the flap being pushed out of the way at the time of air bag deployment. That example also illustrates one technique for attaching vehicle accessories to the countermeasure.

The second embodiment of the invention shows a countermeasure which is not employed with a side air bag, and in which the vehicle accessory extends through an opening in the countermeasure, and a fastener connects the accessory through the accessory, the countermeasure and into a receiver located within the siderail.

These particular illustrations point out the wide variety of designs which fall within the scope of the present invention and the variety of ways in which accessories can be attached. While both embodiments show that the countermeasure is used as a platform for the attachment of accessories, that is not required for the present invention, and accessories can be attached in more conventional ways without departing from the spirit and scope of this invention.

Another aspect of the present invention is schematically illustrated herein, i.e., the use of the countermeasure interior as a continuation of a track for vehicle sun visors, such as those which are moved to track the sun. For example, the visors can be located, as shown, in front of the driver and front seat passenger, and slide along the illustrated track to the side window position when needed. In lieu of having the track continue within the countermeasure itself, the track for such a visor could be simply attached to the exterior of the countermeasure.

Finally, one particular vehicle roof system is shown including front and rear headers, two cross bows, and three headliner inserts. The number of cross bows, the configuration of the headliner, and any forming of the headliner which may be needed or desired for a particular vehicle can be varied widely and need not be shown in the present FIGURES for purposes of illustrating the invention. Still more specifically, the illustrated embodiment shows a center rail system for the mounting of vehicle accessories such as a compass, sunglass holder, overhead lighting, entertainment, education or informational devices, and the like. Again, the particular design of any such rail system can vary widely without impacting the scope of the present invention, e.g., the rail(s) could be offset from the longitudinal center line of the vehicle.

Proceeding now to a description of the preferred and alternate embodiments, FIG. 1 is an exploded view showing certain components, with other components removed for purposes of ease of explanation. System 10 includes a pair of hollow siderail head impact countermeasures 12 extending generally between a front header 14 and a rear header 16 of a vehicle. The illustrated roof system also includes a pair of cross bows 18.

The headliner of the illustrated embodiment is comprised of a forward section 20, a middle section 21, and a rear section 22, each of which includes various openings and apertures for attachments, as will be readily appreciated by those skilled in the art. In addition, system 10 is shown to include a center rail system 23, such as that described at the beginning section of this portion of the specification. The rail system attachments fit within the openings of the front portion 20 and mid portion 21 of the headliner. It will be appreciated from the description thus far that the countermeasures 12 assist in supporting the headliner, a feature which will become more apparent in connection with the descriptions of FIGS. 2 and 3.

FIG. 1 also illustrates a pair of visors 25 mounted on tracks 27, the tracks being coupled to the forward ends of countermeasures 12 to provide a continuous passageway for movement of the visors as described hereinabove. Alternately, the tracks 27 could be attached to the countermeasures 12 without departing from the invention's intended scope.

Figure 1A:
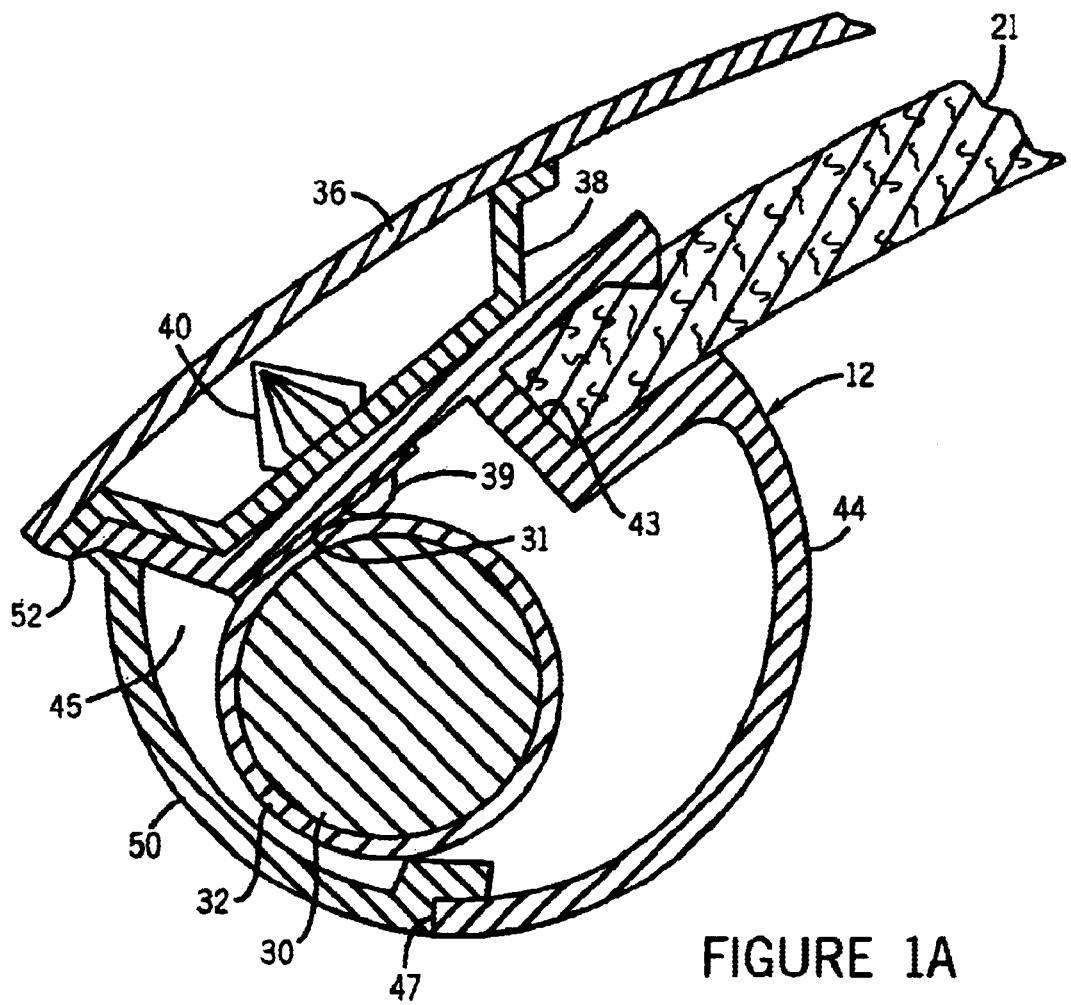
FIG. 1A is a sectional view of the siderail extrusions of FIG. 1 in an assembled state.

Finally, FIG. 1 shows an air bag 30 rolled into an elongate, generally cylindrical form to be inserted into each countermeasures 12 as illustrated by the coupling line. Moreover, an inflator 32 for the air bag 30 is shown in this FIGURE. FIG. 1A is a sectional view of the assembled system shown in FIG. 1. The inflator 32 could be installed at other locations, such as in the A or B pillars of the vehicle.

Countermeasure 12 is shown in considerably greater detail in FIG. 2. FIG. 2A illustrates countermeasure 12 being deformed during impact with a vehicle occupant's head. This FIGURE also shows certain additional components including the roof sheet metal 36 and a vehicle siderail 38 which, in and of themselves, are conventional. Countermeasure 12 is attached to siderail 38 using a fastener 39 extending into a fastener clip 40. A wide variety of techniques can be used for such attachment, including welding, riveting, the use of threaded fasteners, the use of adhesives and the like. FIG. 2 also shows a headliner 21 (which can be selected from any of those known in the art including those made from foam, fibers, mixtures of foam and fibers, etc.). Air bag 30 is also shown and is located within the hollow interior 45 of extrusion 12. Air bag 30 could be attached to the countermeasure 12, such as by strip 31 held by fastener 39. Extrusion 12 includes a side wall which initially forms a slot 43 for receiving an edge of headliner portion 21, a generally rounded surface 44 facing the vehicle interior, and a slot 47 located at its lower portion. In the illustrated embodiment, the slot is closed by a flap 50 (preferably formed of a polymer or an elastomer or mixtures thereof), which flap is coupled to countermeasure 12 by a live hinge 52. The hinge could be a multi-part hinge, e.g., one having two parts. The flap 50, because it is made from a less rigid material than the wall of countermeasure 12, will readily push out of the way of air bag 30 when it is deployed along the side of the vehicle.

One technique for coupling vehicle accessories to a countermeasure is also illustrated in FIG. 2. The accessory chosen for purposes of illustration only is a coat hook 60 which is coupled to a "T-shaped" receiving opening 55 in surface 44 of countermeasure 12. A connector 62 extends from the back side of coat hook 60 and may be moved along the length of countermeasure 12 until the desired location is reached. When the appropriate location is determined, the connector 62 may be secured by rotation to extend the length thereof and form a frictional coupling within receiver 55. Other attachment techniques will appear to those skilled in the art and are within the invention's intended scope. Among these are the use of adhesives, threaded fasteners, detachable fasteners (such as VELCRO® hook and loop fastener), etc. Other accessories can be attached above or in combination with hook 60, e.g., grab handles, lights, visors, informant accessories, vents, power couplings, computer ports, consoles, trim garnish, nets, receptacles, etc.

FIG. 3 illustrates a different shape for a countermeasure 65 suitably attached to siderail 38 as shown in the previous FIGURE. In this case, the countermeasure includes a slot 68 for receiving the middle section of the headliner 21, and a flat surface 69 facing toward the interior of the vehicle. Countermeasure 65 also includes a hollow interior 66 for the reasons discussed previously. FIG. 3A illustrates countermeasure 65 being deformed during impact with a vehicle occupant's head.

In this embodiment, a coat hook 75 is attached to the siderail 38 using a threaded fastener 77. A collar 76 extends from the back side of coat hanger 75 and is open to receive the fastener 77 therethrough.

As can be readily appreciated from, FIGS. 2 and 3, the attachment may be made directly to the vehicle siderail, other fixed structures within the vehicle, or, as illustrated in FIG. 2, to the countermeasure itself.

While the present invention has been described in connection with a preferred and an illustrated alternate embodiments, the invention is not to be limited in terms of materials, dimensions, the use of accessories, air bags, and the like, but is to be limited solely by the scope of the claims which follow.

What is claimed is:

1. An impact countermeasure system for a vehicle having a roof with a perimeter and a headliner, the system comprising:

at least one generally hollow, elongate element adapted to extend horizontally in the vehicle in the vicinity of the roof perimeter, the at least one element being made from a material and having a wall with a thickness selected to deform in the event of contact by a vehicle occupant's head during an accident or impact, wherein the wall has a first surface adapted to face the vehicle occupant's head and a second opposite surface facing a hollow interior of the element wherein a portion of the element is configured to assist in supporting the headliner; and a vehicle accessory removably attached to the element, wherein the accessory is attached to the at least one element without a fastener.

2. The countermeasure system of claim 1 wherein the at least one element is constructed of a material selected from the group consisting of metals, metal alloys, polymers, and elastomers.

3. The countermeasure system of claim 1 wherein the wall thickness is between about 0.5 mm and 5 mm.

4. The countermeasure system of claim 1 wherein the at least one element has a generally circular cross-section.

5. The countermeasure system of claim 1 wherein the vehicle accessory is fastened to the vehicle through the element.

6. The countermeasure system of claim 1 wherein the vehicle accessory is attachable to the element at a preselected location along a length of the element.

7. The countermeasure system of claim 1 further includes, in addition to the accessory, an air bag located within the at least one element.

8. The countermeasure system of claim 7 wherein an air bag inflator is also located within the at least one element.

9. The countermeasure system of claim 7 wherein the at least one element includes a slot along a length of the element through which the air bag is deployed upon the accident or impact.

10. The countermeasure system of claim 9 wherein the slot is closed by a flap prior to the deployment of the air bag and the flap opens upon the deployment of the air bag.

11. An occupant protection system for a vehicle, the vehicle including siderails, a headliner and a vehicle roof, the protection system comprising:

at least one head impact countermeasure extending along the siderails for a length sufficient to assist in protecting occupants seated on both sides of the vehicle and in at least two seat rows;

the at least one countermeasure being hollow and having an interior defined by a wall;

the volume of the interior and the thickness of the wall being selected to allow the at least one head impact countermeasure to deform when struck by the head of one of the occupants during an accident or impact, wherein a track for a movable sun visor is coupled to the at least one head impact countermeasure and wherein the wall at least partially forms the track.

12. The occupant protection system of claim 11 wherein a portion of the at least one head impact countermeasure assists in supporting the vehicle headliner.

13. The occupant protection system of claim 12 wherein the track extends into the interior of the at least one head impact countermeasure.

14. The occupant protection system of claim 11 wherein an air bag is located within the at least one head impact countermeasure.

15. The occupant protection system of claim 14 wherein a slot extends along the at least one head impact countermeasure for deployment of the air bag.

16. The occupant protection system of claim 15 wherein the slot is closed by a material flap prior to the deployment of the air bag and the flap opens upon the deployment of the air bag.

17. The occupant protection system of claim 11 wherein the track is integrally formed as part of a single unitary body with the wall.

18. The occupant protection system of claim 11 wherein the wall has a first surface configured to be exposed to an interior of the vehicle.

19. The occupant protection system of claim 18 including a flap having a terminal end in engagement with and supported by the wall, wherein the terminal end has a second surface substantially flush with the first surface.

20. The countermeasure system of claim 1 wherein the at least one element includes an elongate track configured to support the accessory at one of a plurality of positions along the track.

21. The countermeasure system of claim 20 wherein the at least one element includes a wall forming an element interior, wherein the wall at least partially forms the track.

22. The countermeasure system of claim 21 wherein the track is integrally formed as part of a single unitary body with the wall.

23. The countermeasure system of claim 20 wherein the at least one element includes a wall forming an element interior and wherein the wall has a first surface configured to be exposed to a vehicle interior.

24. The countermeasure system of claim 23 including a flap having a terminal end supported by and in engagement with the wall, wherein the terminal end has a second surface substantially flush with the first surface.

25. The countermeasure system of claim 1 including a first mechanism configured to attach the element to a support structure of the vehicle and a second mechanism attaching the accessory to the element.

26. The countermeasure system of claim 1 wherein the at least one element is configured to be coupled to a support structure of the vehicle and wherein the system includes an air bag disposed within the at least one element and sandwiched between the accessory and the support structure.

27. The countermeasure system of claim 1 wherein the at least one element is configured to be coupled to a support structure of the vehicle and wherein the at least one element is configured to extend between an air bag within the element and the support structure.

28. The countermeasure system of claim 1 wherein the at least one element has a surface exposed to an interior of the vehicle.

29. The countermeasure system of claim 1 including an air bag within the at least one element, wherein the at least one element has a surface exposed to a vehicle interior while the air bag is concealed from the vehicle interior.

30. The countermeasure system of claim 1 wherein the at least one element includes an opening configured to receive an end portion of the headliner.

31. An impact countermeasure system for a vehicle having a support structure proximate an interior of the vehicle along a roof perimeter, the system comprising:
   an elongate element forming an element interior and configured to extend horizontally in the vehicle in a vicinity of the roof perimeter, wherein the element is made from a material and has a wall with a thickness selected such that the wall deforms in the event of contact by a vehicle occupant's head during an accident or impact; and
   a track coupled to the element, wherein the track is configured to support a vehicle accessory in one of a plurality of positions along the track, wherein the wall at least partially forms the element interior and wherein the wall at least partially forms the track.

32. The countermeasure system of claim 31 wherein the track is integrally formed as part of a single unitary body with the wall.

33. The countermeasure system of claim 31 wherein the wall forms the element interior and wherein the wall has a first surface configured to be exposed to the interior of the vehicle.

34. The countermeasure system of claim 33 including a flap having a terminal end in engagement with and supported by the wall, wherein the terminal end has a second surface substantially flush with the first surface.

35. An impact countermeasure system for a vehicle having a vehicle interior and a support structure extending at least partially along a roof perimeter in the vehicle interior, the system comprising:
   an elongate element having a wall at least partially forming an element interior, wherein the element is configured to extend horizontally in the vehicle in a vicinity of the roof perimeter, wherein the wall is made from a material and has a wall thickness selected so as to deform in the event of contact by a vehicle occupant's head during an accident or impact;
   a vehicle accessory;
   a first mechanism configured to attach the element to the support structure of the vehicle; and
   a second mechanism attaching the accessory to the element and an air bag disposed within the element interior and sandwiched between the accessory and the support structure.

36. The countermeasure system of claim 35 wherein the element is configured to extend between an air bag within the element interior and the support structure.

37. The countermeasure system of claim 35 wherein the element has a surface exposed to the vehicle interior.

38. The countermeasure system of claim 35 including an air bag within the element interior, wherein the element has a surface exposed to the vehicle interior while the air bag is concealed from the vehicle interior.

39. An impact countermeasure system for a vehicle having a support structure proximate an interior of the vehicle along a roof perimeter, the system comprising:
   an elongate element forming an element interior and configured to extend horizontally in the vehicle in a vicinity of the roof perimeter, wherein the element is made from a material and has a wall with a thickness selected such that the wall deforms in the event of contact by a vehicle occupant's head during an accident or impact; and
   a track coupled to the element, wherein the track is configured to support a vehicle accessory in one of a plurality of positions along the track, wherein the wall forms the element interior and wherein the wall has a surface configured to be exposed to the interior of the vehicle.

40. An occupant protection system for a vehicle, the vehicle including siderails, a headliner and a vehicle roof, the protection system comprising:
   at least one head impact countermeasure extending along the siderails for a length sufficient to assist in protecting occupants seated on both sides of the vehicle and in at least two seat rows;
   the at least one countermeasure being hollow and having an interior defined by a wall;
   the volume of the interior and the thickness of the wall being selected to allow the at least one head impact countermeasure to deform when struck by the head of one of the occupants during an accident or impact wherein a track for a movable sun visor is coupled to the at least one head impact countermeasure and wherein an air bag is located within the at least one head impact countermeasure.

41. An impact countermeasure system for a vehicle having a roof with a perimeter and a headliner, the system comprising:
   at least one generally hollow, elongate element extending horizontally in a vehicle in the vicinity of the roof perimeter, the at least one element being made from a material and having a wall thickness selected to deform in the event of contact by a vehicle occupant's head during an accident or impact, wherein a portion of the element is configured to assist in supporting the headliner; and
   a vehicle accessory removably attached to the element;
   an airbag located within the at least one element.

42. An impact countermeasure system for a vehicle having a roof with a perimeter and a headliner, the system comprising:
   at least one generally hollow, elongate element extending horizontally in a vehicle in the vicinity of the roof perimeter, the at least one element being made from a material and having a wall thickness selected to deform in the event of contact by a vehicle occupant's head during an accident or impact, wherein a portion of the element is configured to assist in supporting the headliner; and
   a vehicle accessory removably attached to the element, wherein the at least one element has a surface exposed to an interior of the vehicle.

43. An impact countermeasure system for a vehicle having a roof with a perimeter and a headliner, the system comprising:
   at least one generally hollow, elongate element extending horizontally in a vehicle in the vicinity of the roof perimeter, the at least one element being made from a material and having a wall thickness selected to deform in the event of contact by a vehicle occupant's head during an accident or impact, wherein a portion of the element is configured to assist in supporting the headliner; and
   a vehicle accessory removably attached to the element, wherein the at least one element includes an opening configured to receive an end portion of the headliner.

44. An impact countermeasure system for a vehicle having a roof with a perimeter and a headliner, the system comprising:

at least one generally hollow, elongate element extending horizontally in a vehicle in the vicinity of the roof perimeter, the at least one element being made from a material and having a wall thickness selected to deform in the event of contact by a vehicle occupant's head during an accident or impact, wherein a portion of the element is configured to assist in supporting the headliner;

a vehicle accessory removably attached to the element; and an air bag within the at least one element, wherein the at least one element has a surface exposed to a vehicle interior while the air bag is concealed from the vehicle interior.

* * * * *